Nov. 12, 1946.  W. DILLON  2,410,813
METHOD OF FORMING CASINGS
Filed May 8, 1942

INVENTOR
WALTER DILLON
BY
ATTORNEY

Patented Nov. 12, 1946

2,410,813

UNITED STATES PATENT OFFICE 2,410,813

METHOD OF FORMING CASINGS

Walter Dillon, United States Navy

Application May 8, 1942, Serial No. 442,216

14 Claims. (Cl. 29—1.21)

(Granted under the act of March 3, 1883, as amended April 30, 1928; 370 O. G. 757)

This invention relates to a method of metalworking, and more particularly to a method of forming bomb casings, shells, projectiles or the like, as well as other forms of cylindrical objects.

In the past, it has required a great deal of time, skill and machinery to fabricate bomb casings, shells, and projectiles, etc., and the procedure has entailed a great deal of expense.

Obviously, any process which will save time, machines, man power, materials, and expense, or any one of these features is considered a great advancement in the art, particularly under conditions as they now exist. The particular process herein disclosed will, when practised, attain the desired result and simultaneously save more time than was heretofore thought possible, save at least 75% of skilled man power, enable precision machine tools to be utilized for other purposes, save approximately 10 to 15% of metal and cut the cost of manufacture to a fraction.

Instead of forging, stamping, or molding bomb casings and the like, and thereafter machining the casing, (any one of which methods requires considerable time, skill and machinery) it has been suggested to form bomb casings and the like from seamless steel tubing. Seamless steel tubing can and is being made in large quantities by simple drawing processes, and the supply thereof is large and can be supplemented as the needs require by plants which have already been established. If, therefore, bomb casings, shells and the like could satisfactorily be formed from tubing, production would be greatly increased.

It has been known in the past to form closed cylinders by the so-called "spinning" process wherein seamless steel tubing has been heated and thereafter spun or rotated at a high rate of speed, while a blunt tool contacts an open end of the cylinder and gradually and progressively forces the outer periphery of the tubing inwardly to close the tube. Normally, the tool is mounted in a suitable carriage, the carriage supporting the tool for longitudinal and cross feeding, so that the tool may gradually swing around the end of the tubing. The friction created by contact of the tool with the tubing generates intense heat, and by gradual and repeated manipulations of the tool, the end of the tubing may be closed and homogeneously fused together.

It has been suggested to use the above-mentioned spinning process for the formation of bomb casings and the like, and a great deal of experimental work has been done along this line. However, in large-size bombs, such as those weighing 500 lbs. or more, it has heretofore been impossible to close the end of seamless steel tubing so that the nose would have the required thickness, i. e., a thickness substantially greater than that of the side walls of the casing. Many suggestions have been made to overcome this difficulty, such as laminating a preformed nose on to the already closed steel tubing, welding or fusing the metals together and thereafter machining the nose. The suggestion just made, as well as the other processes attempted, have required additional steps which have proved costly and time-consuming.

In the invention herein disclosed, the nose of the bomb may be thickened in the same process as that of originally closing the end of seamless steel tubing. Therefore, an object of this invention is to enable bomb casings to be formed having the desired nose thickness, within a space of time heretofore believed impossible.

Another object of the invention is to form bomb casings having the desired nose thickness and contour without the necessity of machining the same.

Another object of the invention is to form a bomb casing having a nose of substantially greater thickness than that of the casing, and wherein the same may be formed by relatively unskilled workmen, and without the use of precision machine tools.

Other objects of the invention, such as cheapness in manufacture, the saving of metal, etc., will readily ensue to those skilled in the art after having the benefit of this disclosure. One manner of carrying out this process will be described in connection with the accompanying drawing, wherein.

Figure 1:
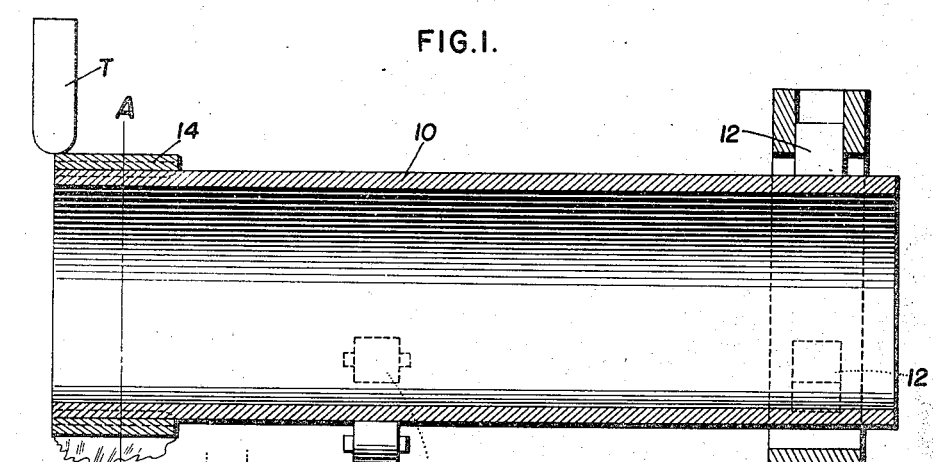
Fig. 1 is a longitudinal sectional view of a piece of steel tubing secured in a chuck of a suitable lathe showing diagrammatically a tool and a suitable source of heat.

Referring now to the drawing, a section of seamless steel tubing 10 having the desired length for a bomb and being of desired thickness for the sides of the bomb casing is inserted in a chuck 11 of a lathe (not shown), and is secured for rotation therein by suitable jaws 12. The tubing may be supported by a plurality of bearings 13, the support for the bearings not being shown.

One manner of increasing the thickness of one end of the tubing, in order to attain the desired thickness of the nose, is to place a cylindrical band 14 (which band may be a short section of seamless tubing) around the outer periphery of the tubing 10 as shown in Fig. 1. This band may be made of the same type of metal as that of tubing 10, or be made of a different and harder metal, as desired. The cylindrical band 14 may be placed over the tubing 10 while both the tube and band are cold and thereafter the assembly heated to preferably a dull red heat, or the tubing 10 may be heated before the band 14 is assembled thereon. In any event, it is desirable to have both the tubing 10 and band 14 in a heated condition before manipulation of the thickened portion of the assembly, although this is not essential. It is possible to practise the method under consideration by applying heat only at the time of manipulation of the thickened tubing, although I prefer to first heat the same to a dull red heat and thereafter maintain or perhaps increase the degree of heat by applying the same at the time of manipulating the thickened portion of the tubing. One manner of accomplishing the heating of the thickened end of the tubing at the time of manipulation is to apply a flame directly thereto by means of a suitable source of heat H.

If the formation of scale on the periphery of the tube and the band becomes a problem, pickling the parts before assembly would be advantageous. Also, it would be advisable to first heat both the tube and band while they are separated from each other. The band could then be nested on the tube, while both are hot, by spinning the tube and slipping the band on the tube while preventing or retarding rotation of the band. In assembling the parts in this manner, the friction between the two surfaces during assembling would "wipe" the surfaces, and thus clean the scale therefrom.

As previously mentioned, the tool T is supported in a suitable carriage (not shown) in such a manner that the tool will have a substantially universal movement.

Before contact is made between the tool T and band 14, the tube and band assembly are rotated at a relatively high rate of speed by means of the chuck 11, the speed of rotation varying from 500 or 600 to 1500 or 2000 revolutions per minute, depending upon the speed of manipulation of the tool T and the thickness of the tubing. When contact is made between the tool T and the band 14, the friction of the tool created by the contact of the rotating band generates an intense heat which will supplement the heat being supplied by source H. The exact degree of heat is not critical and may vary considerably with respect to the thickness of the metal.

Figure 2:
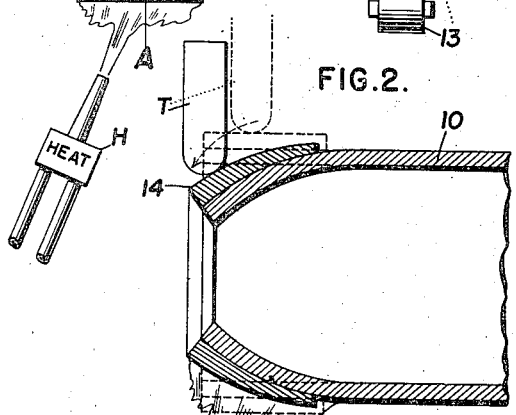
Fig. 2 is a fragmentary longitudinal sectional view of the end of the tubing, showing the end partially shaped.

By gradual and repeated manipulation of the tool T in a manner well known to those skilled in the art, the end of the tubing including the band 14 thereon will gradually take the shape from that shown in dotted lines in Fig. 2 to that shown in full lines in Fig. 2. Continuation of the tool manipulation will result in the structure shown in Fig. 3 wherein the end of the tube has been closed and suitably shaped, and the two laminated sections of metal, the tube 10 and band 14, will be welded into a homogeneous ogival shaped nose, the metal in the nose being in an autogeneous composition rather than a laminated structure. The manipulation of the tool in closing the end of the tubing and forming an autogeneous composition of the two metals, works the periphery of the nose sufficiently smooth so as to alleviate the necessity of grinding or otherwise machining the same.

Figure 3:
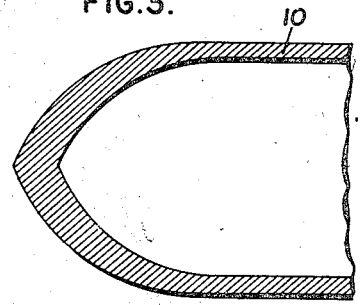
Fig. 3 is a fragmentary longitudinal sectional view of the completed nose of a bomb casing having the desired shape and required thickness.

It will be seen by an inspection of Fig. 3 that the nose is approximately two and one-half times the thickness of the sides of the tubing, and the thickness gradually tapers until, at the point of merger of the nose with the sides, the nose is reduced in thickness to substantially that of the sides. The increase of the thickness of the nose will depend, of course, on the thickness and shape of the band. This thickness may be increased or decreased at will.

Figure 4:
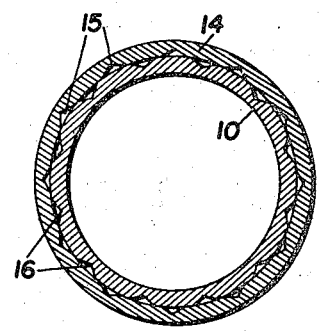
Fig. 4 is a sectional view taken on line A—A of Fig. 1.

As seen in Fig. 4, the band 14 may be grooved on its inner periphery as indicated at 15, and also, if desired, the tubing 10 may be grooved on its outer periphery as at 16. The grooves may extend longitudinally as shown or may extend circumferentially. The main function of grooving the parts is to provide a greater surface area of contact between the parts and to permit the metal to fuze more readily. The band 14 would be positioned over the end of the tubing 10 in such a manner that the grooves 15 and 16 would have a staggered relation to one another. Therefore, formation of the grooves 15 and 16 assist in the homogeneous fuzing of the metals.

Figure 5:
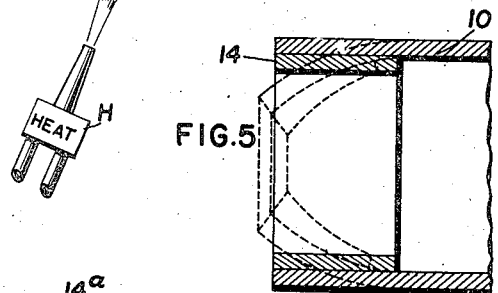
Fig. 5 is a fragmentary longitudinal sectional view of a modified manner of thickening one end of the tubing.

A modification is shown in Fig. 5, wherein the band 14 is laminated with the tubing 10 by inserting the band within the tubing. Thereafter, the process is substantially the same as that previously described.

Figure 6:
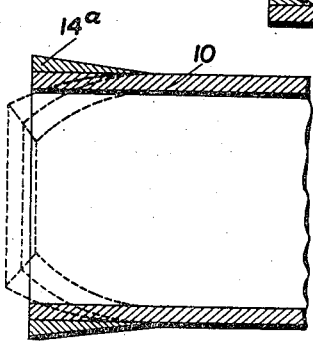
Fig. 6 is a fragmentary longitudinal sectional view of another modified form of thickening one end of the tubing.

A further modification is shown in Fig. 6 wherein the band 14a is tapered in thickness throughout its width, the thickest portion of the band 14a being at its outer side. Here again, the remaining process is substantially the same as that described with reference to Fig. 1 through 3.

It will be obvious that the band 14 or 14a may take other desired forms or shapes, depending entirely upon the desired shape of the nose and particularly the thickness thereof. Also, if desired, the tubing may also be tapered to take any desired shape.

While this invention has been shown and described in connection with bomb casings, shells, projectiles and the like, it will be obvious to one skilled in the art that it may be utilized in the forming of any type of cylindrical article wherein one or both ends of the cylinder are closed, and wherein it is desirable to have the ends stronger and/or thicker than the side walls.

The invention herein described may be manufactured and used by or for the Government of the United States of America for governmental purposes without the payment of any royalties thereon or therefor.

What is claimed as new and desired to be secured by Letters Patent of the United States is:

1. The method of forming a cylindrical object having side walls and a closed end wall from metal tubing including the steps of adding metal to one end of the tubing to thereby thicken said end of the tubing, spinning the thickened tubing, and manipulating the thickened end, while spinning, into a closed homogeneously fused end wall having a thickness substantially greater than the side walls.

2. The method of forming a cylindrical object having side walls and a closed end wall from metal tubing wherein the end wall has a substantially greater thickness than the side walls, including adding metal to one end of the tubing to thereby thicken said end of the tubing, applying heat to the thickened end of the tubing, thereafter spinning the tubing and applying additional heat thereto while spinning, and manipulating the thickened end of the tubing into a closed homogeneously fuzed end wall.

3. The method of forming a shell, bomb casing or the like from metal tubing having side walls and an ogival shape nose of greater thickness than the side walls, including adding metal to one end of the tubing to thereby thicken said end of the tubing, spinning the thickened tubing, and manipulating the thickened end, while spinning, into a closed ogival shaped nose, of a thickness substantially greater than the side walls.

4. The method of forming a shell, bomb casing or the like from metal tubing having side walls and an ogival shape nose of greater thickness than the side walls, including adding metal to one end of the tubing to thereby thicken said end of the tubing, spinning the thickened tubing, and manipulating the thickened end, while spinning, into a closed ogival shaped nose of a thickness substantially greater than the side walls, the thickness of the nose gradually decreasing from the point of the nose to the point of merger with the side walls.

5. The method of forming a shell, bomb casing or the like from metal tubing including adding metal to one end of the tubing to thereby thicken said end of the tubing, spinning the thickened tubing and simultaneously applying heat to the thickened portion of the tubing, and manipulating the thickened portion of the tubing, while spinning, into an ogival shape.

6. The method of forming a shell, bomb casing or the like from metal tubing including adding metal to one end of the tubing to thereby thicken said end of the tubing, applying heat to the thickened portion of the tubing, thereafter spinning the tubing and applying additional heat thereto while spinning, and manipulating the thickened end of the tubing, while spinning and applying heat, into a closed nose of the desired shape.

7. The method of forming a shell, bomb casing or the like from metal tubing having side walls and an ogival shaped nose of greater thickness than the side walls, including thickening one end of the tubing by placing a metal band around the outer periphery of the tubing, spinning the thickened tubing, and manipulating the thickened end, while spinning, into a closed ogival shaped nose of a thickness substantially greater than the side walls.

8. The method of forming a shell, bomb casing or the like from metal tubing having side walls and an ogival shaped nose of greater thickness than the side walls, including thickening one end of the tubing by nesting a metal band with one end of the tubing, spinning the thickened tubing, and manipulating the thickened end, while spinning, into a closed ogival shaped nose of a thickness substantially greater than the side walls.

9. The method of forming a shell, bomb casing or the like from metal tubing having side walls and a suitably shaped nose of greater thickness than the side walls, including thickening one end of the tubing by inserting a metal band within the tubing, spinning the tubing at relatively high speeds, and manipulating the thickened end, while spinning, into a closed suitably shaped nose having a thickness substantially greater than the side walls, the thickness of the nose gradually increasing from the point of merger of the nose with the side walls, outwardly.

10. The method of forming a shell, bomb casing or the like from metal tubing having side walls and an ogival shaped nose of greater thickness than the side walls, including thickening one end of the tubing by positioning a metal band around the outer periphery of one end of the tubing, spinning the thickened tubing and simultaneously applying heat to the thickened portion of the tubing, and manipulating the thickened portion of the tubing, while spinning, into a closed ogival shaped nose having a thickness substantially greater than the side walls.

11. The method of forming a shell, bomb casing or the like from tubing having side walls and an ogival shaped nose of greater thickness than the side walls, including thickening one end of the tubing by inserting a metal band within one end of the tubing, applying heat to the thickened end of the tubing, spinning the tubing and applying additional heat thereto simultaneously, and manipulating the thickened end of the tubing, while spinning and applying heat, into a closed ogival shaped nose having a thickness substantially greater than the side walls.

12. The method of forming a shell, bomb casing or the like from tubing having side walls and an ogival shaped nose of greater thickness than the side walls, including forming grooves on the outer periphery of one end of the tubing, placing a band having grooves on its inner periphery around the outer periphery of the tubing, applying heat to the thickened portion of the tubing, spinning the tubing at relatively high speeds and applying additional heat thereto simultaneously, and manipulating the thickened end of the tube, while spinning and applying heat, into a closed ogival shaped nose having a thickness substantially greater than the side walls.

13. The method of forming a shell, bomb casing or the like from tubing having side walls and an ogival shaped nose of greater thickness than the side walls, including thickening one end of the tubing by placing a tapering metal band round the outer periphery of the tubing, the thickness of the band being greatest at its outer end, applying heat to the thickened portion of the tubing, spinning the tubing and applying additional heat thereto simultaneously, and manipulating the thickened end of the tubing, while spinning and applying heat, into a closed ogival shaped nose having a thickness substantially greater than the side walls, the thickness of the nose gradually decreasing from the point of the nose to the point of merger with the side walls.

14. The method of forming a shell, bomb casing or the like from tubing having side walls and an ogival shaped nose of greater thickness than the side walls, including heating the tubing, heating a metal band, spinning the tubing and simultaneously assembling the band and the tubing to effect a wiping action between the contacting surfaces of the tubing and the band, applying additional heat to the assembly of the tube and the band, while spinning the assembly, and manipulating the assembly into a closed ogival shaped nose.

WALTER DILLON.